(12) United States Patent
Perez et al.

(10) Patent No.: US 12,728,697 B2
(45) Date of Patent: Sep. 8, 2026

(54) MOVABLE DUCT FOR A VEHICLE

(71) Applicant: GM Global Technology Operations LLC, Detroit, MI (US)

(72) Inventors: Joel Perez, Lerma (MX); Juan Diego Bobadilla, Calimaya (MX); Jose Eduardo Marquez, Toluca (MX)

(73) Assignee: GM Global Technology Operations LLC, Detroit, MI (US)

( * ) Notice: Subject to any disclaimer, the term of this patent is extended or adjusted under 35 U.S.C. 154(b) by 303 days.

(21) Appl. No.: 18/497,911

(22) Filed: Oct. 30, 2023

(65) Prior Publication Data

US 2025/0135835 A1 May 1, 2025

(51) Int. Cl.
*B60H 1/00* (2006.01)
*B60R 11/00* (2006.01)

(52) U.S. Cl.
CPC .. *B60H 1/00564* (2013.01); *B60R 2011/0007* (2013.01)

(58) Field of Classification Search
CPC ...... B60H 1/00564; B60H 1/24; B60H 1/241; B60H 1/242; B60H 1/244; B60H 1/246; B60R 2011/0007; B60R 2011/0008
USPC .......................................................... 296/208
See application file for complete search history.

(56) References Cited

U.S. PATENT DOCUMENTS 3,916,639 A * 11/1975 Atkinson ............... B60N 3/104 62/331
5,095,942 A * 3/1992 Murphy .................. F16L 41/02 137/561 A
6,273,495 B1 * 8/2001 Haba .................... B60H 1/0055 296/70
9,746,107 B2 8/2017 Tani et al.
10,076,958 B1 * 9/2018 Raines ............... B60H 1/00564
11,034,209 B2 6/2021 Cano et al.
12,515,497 B2 * 1/2026 Woodward ............. B60H 1/242
2006/0258282 A1 * 11/2006 Heck ...................... B60H 1/244 454/143
2012/0280538 A1 * 11/2012 Lummitsch ........ B60H 1/00564 296/70
2017/0072772 A1 * 3/2017 Salter ..................... B60H 1/246
2020/0130458 A1 * 4/2020 Cano ...................... B60H 1/243
2022/0194166 A1 * 6/2022 Harris ................ B60H 1/00292
2022/0227202 A1 * 7/2022 Maier ................ B60H 1/00542
2024/0383311 A1 * 11/2024 Nageshkar ......... B60H 1/00871
2024/0416716 A1 * 12/2024 Clark ..................... B60H 1/246
2025/0135835 A1 * 5/2025 Perez ..................... B60H 1/246

FOREIGN PATENT DOCUMENTS

DE 60203886 T2 2/2006
DE 102016117143 A1 3/2017

* cited by examiner

*Primary Examiner* — Gregory A Blankenship
(74) *Attorney, Agent, or Firm* — Honigman LLP; Matthew H. Szalach

(57) ABSTRACT

A movable duct includes an inlet duct segment including an inlet duct wall extending from a first inlet duct end to an opposite second inlet duct end and including at least one first elongate guide extending between the first inlet duct end and the second inlet duct end. The movable duct further includes a first telescopic duct segment having a first telescopic duct wall extending from a first telescopic duct end to an opposite second telescopic duct end and including at least one protrusion slidingly engaged with the at least one elongate guide of the inlet duct segment.

18 Claims, 3 Drawing Sheets

16
17
19
23
24
25a
25b
26
28
30
32
34
36
38
40

MOVABLE DUCT FOR A VEHICLE

INTRODUCTION

The information provided in this section is for the purpose of generally presenting the context of the disclosure. Work of the presently named inventors, to the extent it is described in this section, as well as aspects of the description that may not otherwise qualify as prior art at the time of filing, are neither expressly nor impliedly admitted as prior art against present disclosure.

The present disclosure relates generally to a movable duct for a vehicle.

Vehicles generally include a plurality of ducts configured to provide air from a vehicle heating, ventilation, and air conditioning (HVAC) system to a targeted location within an interior passenger compartment of the vehicle. One location that requires targeted ducts is near a user device charging station. As charging user devices often creates heat, the duct is needed to provide cooling to the user device and charging area. Some vehicles include user device charging stations on a vehicle console.

Some vehicles may include a vehicle console, which is movable between various positions. Current solutions to provide cooling to the user device regardless of the position of the vehicle console include continuously flowing the air at maximum power to reach the user device charging station. However, operating the HVAC system at maximum power results may result in air losses and customer dissatisfaction due the poor performance and noise. As such, there remains a need for an improved vehicle duct compatible with a movable vehicle console.

SUMMARY

An aspect of the disclosure provides a movable duct for a motor vehicle. The movable duct includes an inlet duct segment including an inlet duct wall extending from a first inlet duct end to an opposite second inlet duct end and including at least one first elongate guide extending between the first inlet duct end and the second inlet duct end. The movable duct further includes a first telescopic duct segment having a first telescopic duct wall extending from a first telescopic duct end to an opposite second telescopic duct end and including at least one protrusion slidingly engaged with the at least one elongate guide of the inlet duct segment.

Aspects of the disclosure may include one or more of the following optional features. In some examples, the second inlet duct end of the inlet duct segment includes a leading portion defining a tapering width of the inlet duct wall. In some configurations, the first telescopic duct end includes a bell mouth defining a flared width of the inlet duct wall, whereby the leading portion is configured to mate with the bell mouth. In some implementations, the leading portion includes one or more locating features each configured to receive and align the at least one protrusion of the first telescopic duct segment with the first elongate guide of the inlet duct segment.

In some examples, the first elongate guide defines a recessed channel formed in the inlet duct wall. In some implementations, the first telescopic duct segment includes at least one second elongate guide extending between the first telescopic duct end and the second telescopic duct end and, the movable duct further includes a second telescopic duct segment including a second telescopic duct wall extending from a third telescopic duct end to an opposite fourth telescopic duct end and including at least one protrusion slidingly engaged with the at least one second elongate guide of the first telescopic duct segment.

Another aspect of the disclosure includes a vehicle having a vehicle heating, ventilation, and air conditioning (HVAC) system configured to bring air to a desired temperature. The vehicle further includes a vehicle passenger compartment configured to allow a vehicle passenger therein. The vehicle further includes a movable duct having a body defining an interior conduit configured to provide fluid communication from the vehicle HVAC system to the vehicle passenger compartment, the body having an inlet duct segment coupled to the vehicle HVAC system and an outlet duct segment coupled to the vehicle passenger compartment, wherein the outlet duct segment is movable between an extended configuration where the outlet duct segment is located in a first location in the vehicle passenger compartment and a retracted configuration where the outlet duct segment is located in a second location in the vehicle passenger compartment.

This aspect of the disclosure may include one or more of the following optional features. In some examples, movement of the movable duct between the extended configuration and the retracted configuration is translational movement. In some implementations, movement of the movable duct between the extended configuration and the retracted configuration is telescopic movement such that the inlet duct segment and the outlet duct segment are concentric. In some configurations, the body of the movable duct further includes one or more intermediate duct segments concentric with the inlet duct segment and the outlet duct segment. Optionally, the inlet duct segment includes an elongate guide defining a channel extending along an axial direction.

In some configurations, the outlet duct segment includes a retaining protrusion configured to slidingly engage the elongate guide to prevent rotational movement between the inlet duct segment and the outlet duct segment. In some examples, the inlet duct segment further includes a ramp leading portion formed at an end of the inlet duct segment to aid coupling of the inlet duct segment and the outlet duct segment. In some implementations, the vehicle passenger compartment includes a movable vehicle console, and the outlet duct segment is at least partially disposed within a movable vehicle console. Optionally, at least one of the inlet duct segment or the outlet duct segment are produced by a blow molding operation.

Another aspect of the disclosure provides a movable duct for a vehicle having a vehicle heating, ventilation, and air conditioning (HVAC) system and a vehicle passenger compartment. The movable duct includes a body defining an interior conduit and having an inlet duct segment coupled to the vehicle HVAC system and an outlet duct segment coupled to the vehicle passenger compartment, wherein the outlet duct segment is linearly movable between an extended configuration and a retracted configuration and movement of the outlet duct segment between the extended configuration and the retracted configuration is telescopic movement such that the inlet duct segment and the outlet duct segment are concentric.

This aspect of the disclosure may include one or more of the following optional features. In some examples, the body of the movable duct further includes an intermediate duct segment concentric with the inlet duct segment and the outlet duct segment. In some implementations, the body of the movable duct further includes a second intermediate duct segment concentric with the inlet duct segment, the intermediate duct segment, and the outlet duct segment. In some configurations, one or more of the inlet duct segment or the outlet duct segment include a retaining protrusion configured to prevent rotational movement between the inlet duct segment and the outlet duct segment. In some examples, a diameter of the inlet duct segment is smaller than a diameter of the outlet duct segment.

BRIEF DESCRIPTION OF THE DRAWINGS

The drawings described herein are for illustrative purposes only of selected configurations and are not intended to limit the scope of the present disclosure.

Corresponding reference numerals indicate corresponding parts throughout the drawings.

DETAILED DESCRIPTION

Figures 1, 2:
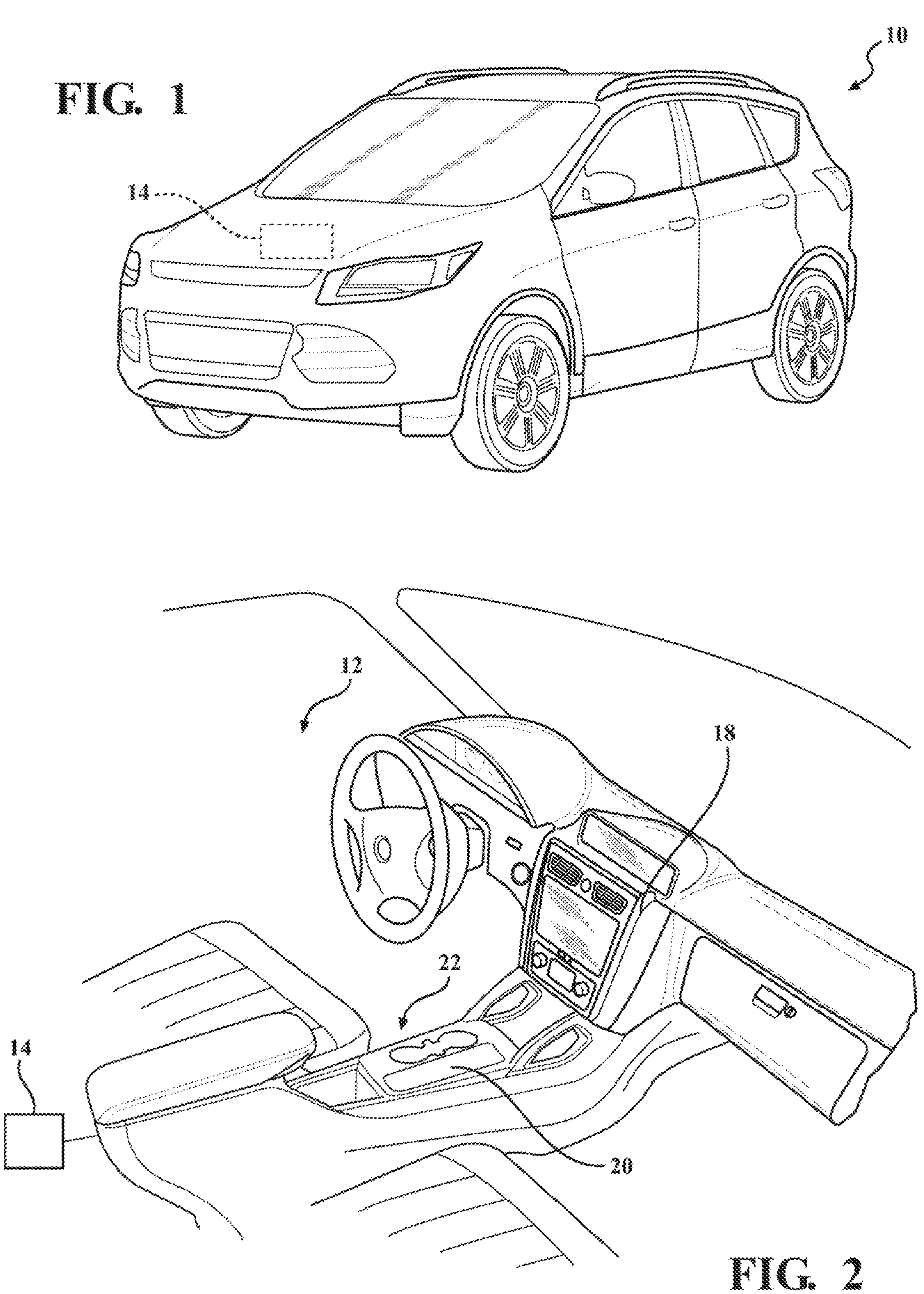
FIG. 1 is an exterior perspective view of a vehicle according to the principles of the present disclosure.
FIG. 2 is an interior perspective view of a vehicle passenger compartment of the vehicle, where the passenger compartment includes a movable vehicle console according to the principles of the present disclosure.

Example configurations will now be described more fully with reference to the accompanying drawings. Example configurations are provided so that this disclosure will be thorough, and will fully convey the scope of the disclosure to those of ordinary skill in the art. Specific details are set forth such as examples of specific components, devices, and methods, to provide a thorough understanding of configurations of the present disclosure. It will be apparent to those of ordinary skill in the art that specific details need not be employed, that example configurations may be embodied in many different forms, and that the specific details and the example configurations should not be construed to limit the scope of the disclosure.

The terminology used herein is for the purpose of describing particular exemplary configurations only and is not intended to be limiting. As used herein, the singular articles "a," "an," and "the" may be intended to include the plural forms as well, unless the context clearly indicates otherwise. The terms "comprises," "comprising," "including," and "having," are inclusive and therefore specify the presence of features, steps, operations, elements, and/or components, but do not preclude the presence or addition of one or more other features, steps, operations, elements, components, and/or groups thereof. The method steps, processes, and operations described herein are not to be construed as necessarily requiring their performance in the particular order discussed or illustrated, unless specifically identified as an order of performance. Additional or alternative steps may be employed.

When an element or layer is referred to as being "on." "engaged to," "connected to," "attached to," or "coupled to" another element or layer, it may be directly on, engaged, connected, attached, or coupled to the other element or layer, or intervening elements or layers may be present. In contrast, when an element is referred to as being "directly on," "directly engaged to," "directly connected to," "directly attached to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

The terms "first," "second," "third," etc. may be used herein to describe various elements, components, regions, layers and/or sections. These elements, components, regions, layers and/or sections should not be limited by these terms. These terms may be only used to distinguish one element, component, region, layer or section from another region, layer or section. Terms such as "first," "second," and other numerical terms do not imply a sequence or order unless clearly indicated by the context. Thus, a first element, component, region, layer or section discussed below could be termed a second element, component, region, layer or section without departing from the teachings of the example configurations.

A number of implementations have been described. Nevertheless, it will be understood that various modifications may be made without departing from the spirit and scope of the disclosure. Accordingly, other implementations are within the scope of the following claims.

Referring to FIGS. 1-6, a vehicle is disclosed at 10. The vehicle 10 includes a vehicle passenger compartment 12, a vehicle heating, ventilation, and air conditioning (HVAC) system 14, and a movable duct 16 configured to move in conjunction with a movable vehicle console 22. Referring now to FIG. 1, in some examples, the vehicle 10 is contemplated to be an electric vehicle 10 (EV) and may include autonomous or semi-autonomous capabilities. Additionally or alternatively, the vehicle 10 may be a hybrid vehicle incorporating both EV and internal combustion engine (ICE) components and capabilities. Additionally, the vehicle 10 may include only an internal combustion engine or other power source, if desired. Moreover, in some examples, the vehicle may additionally and/or alternatively include fuel cell power capabilities.

Referring now to FIG. 2, the vehicle passenger compartment 12 is configured to allow a vehicle passenger to be seated therein. The vehicle passenger compartment 12 may include various features, including but not limited to, an instrument panel 18 disposed at a forward position of the vehicle passenger compartment and a vehicle console 22 generally disposed between a vehicle driver seat and a vehicle passenger seat. In some examples, the vehicle console 22 includes one or more storage compartments. In the illustrated example, the vehicle console 22 includes a user device charging station 20. The user device charging station 20 may include a generally flat surface sized to receive a user device and configured to allow the user to place the user device thereon. The user device may be any mobile device, including but not limited to, a personal smartphone or tablet. In some examples, the user device charging station 20 includes a port for coupling a charging cord thereto to charge to the user device. Additionally or alternatively, the generally flat surface includes wireless charging capabilities such that the user merely places the user device on the generally flat surface to induce charging of the user device. As charging the user device, either wirelessly or through a corded interface generally produces undesirable heat which may degrade battery and charging performance, the vehicle 10 may also be configured to provide cooling to the user device charging station 20 to cool to the user device during charging. In some examples, cooling airflow is provided below the user device charging station 20. However, it is also contemplated that the user device charging station 20 may include one or more apertures configured to provide cooling directly or indirectly to the user device disposed on the charging station. Additionally, various other configurations have been contemplated.

Additionally, in some examples the vehicle console 22 is movable such that the vehicle console 22 is configured to move between a first position and a second position. In some examples, the movement between the first position and the second position is linear movement along a fore and aft direction (i.e., towards and away from the instrument panel 18). However, it is also contemplated that the movement between the first position and the second position may be in any direction including laterally (i.e., cross-car), vertically (i.e., up-down), or diagonally, or may include rotational movement. Moreover, it is contemplated that the vehicle console 22 may be secured at any location between the first position and the second position.

As represented schematically in FIGS. 1 and 2, the vehicle 10 also includes the vehicle HVAC system 14. The vehicle HVAC system 14 is configured to control climate conditions within the vehicle passenger compartment 12. For example, the HVAC system 14 may provide heated or cooled air to the vehicle passenger compartment 12 to control a temperature within the vehicle passenger compartment 12. Additionally, the vehicle HVAC system 14 may also be configured to purify and circulate air throughout the vehicle passenger compartment 12. The operation of the HVAC system 14 may be controlled either automatically or manually by the driver. In some vehicles 10, various distribution zones are controlled individually, either automatically or manually by the driver. For example, the HVAC system 14 may be configured to automatically direct air toward the user device charging station 20 through the movable duct 16 upon placing the user device on the user device charging station 20) and activating the charger, either wired or wireless. However, it is also contemplated that the air is directed towards the user device only when manually selected by the user.

When the vehicle console 22 is moved between the first position and the second position, the user device charging station 20 also moves therewith. To provide continued airflow to the user device charging station 20 regardless of the position of the vehicle console 22, the vehicle 10 also includes the movable duct 16. As best shown in FIGS. 3-6, the movable duct 16 includes a body 17 defining an interior conduit 19 configured to allow airflow from the vehicle HVAC system 14 to the vehicle passenger compartment 12. More specifically, in the illustrated example, the movable duct 16 is configured to allow airflow from the vehicle HVAC system 14 to the user device charging station 20. As such, the body 17 includes an inlet duct segment 24 configured to be coupled to the vehicle HVAC system 14 and an outlet duct segment 26 disposed within the vehicle passenger compartment 12. The illustrated example, the outlet duct segment 26 is coupled to the user device charging station 20, whereby the outlet duct segment 26 is configured to translate with the user device charging station 20.

To allow sufficient airflow to the user device charging station 20 regardless of position of the vehicle console 22, the outlet duct segment 26 is movable between an extended configuration where the outlet duct segment 26 is located in a first location in the vehicle passenger compartment 12 and a retracted configuration where the outlet duct segment 26 is located in a second location in the vehicle passenger compartment 12, which is different than the first location. In some examples, movement between the extended configuration and the retracted configuration corresponds with movement of the vehicle console 22 between the first position and the second position such that the outlet duct segment 26 of the duct remains coupled to the user device charging station 20 during movement between the first position and the second position of the vehicle console 22. Moreover, in some examples, the movement of the duct 16 between the extended configuration and the retracted configuration is linear movement, whereby the outlet duct segment 26 translates along a linear axis relative to the inlet duct segment.

The movement of the duct between the extended configuration and the retracted configuration is telescopic movement such that the inlet duct segment 24 and the outlet duct segment 26 are disposed concentric to one another. The telescopic movement allows one portion of the movable duct 16 to be movable relative to the other portion such that the movement includes one portion sliding out from the other, thereby lengthening the movable duct 16 from the retracted configuration to the extended configuration.

Optionally, the movable duct 16 may include one or more intermediate portions 28 disposed between, and concentric with, the inlet duct segment 24 and the outlet duct segment 26. For example, the movable duct 16 may include the inlet duct segment 24, the outlet duct segment 26, and the intermediate segment 28 disposed adjacent to, and concentric with, the inlet duct segment 24. In this example, in the retracted configuration, the outlet duct segment 26 is the outermost portion and the inlet duct segment 24 is the innermost portion such that in the retracted configuration (FIG. 5) the inlet duct segment 24 is housed or nested within the outlet duct segment 26 and the intermediate segment 28. However, in the extended configuration (FIG. 6), the outlet duct segment 26 has slid away from the inlet duct segment 24 such that the inlet duct segment 24 is housed only partially within the intermediate segment 28 and the outlet duct segment 26 is disposed away from the inlet duct segment 24.

Figures 5, 6:
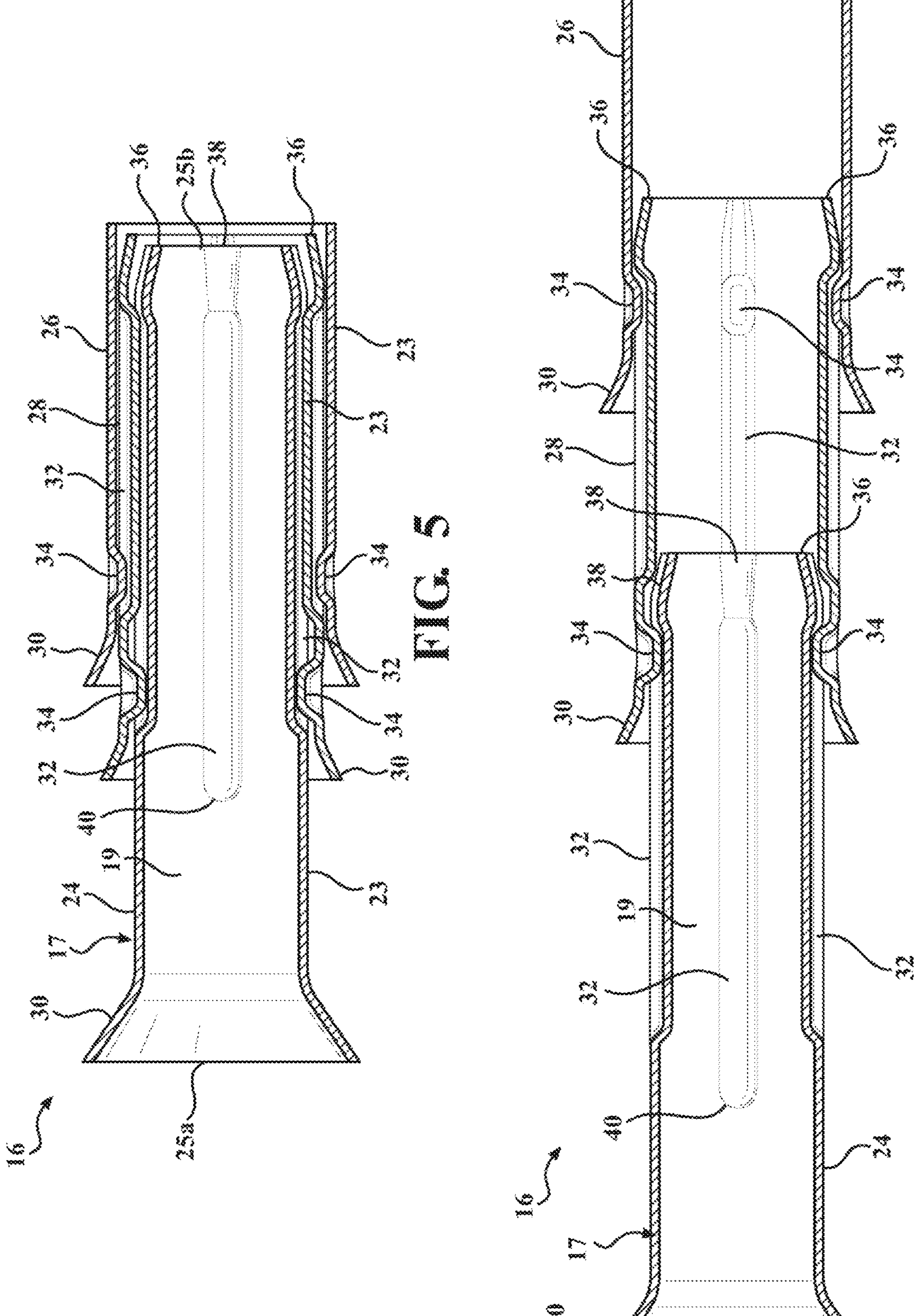
FIG. 5 is cross-sectional view of the movable duct in a retracted configuration.
FIG. 6 is a cross-sectional view of the movable duct in an extended configuration.

While the illustrated example shows an intermediate segment 28 for the sake of illustration, it will be appreciated that the outlet duct segment 26 may be directly coupled to the inlet duct segment 24 in the same manner as the intermediate duct segment 28 shown in this disclosure. In other words, the illustrated relationship between the inlet duct segment 24 and the intermediate duct segment 28 is representative of the relationship between the inlet duct segment 24 and the outlet duct segment 26 when the intermediate duct segment 28 is not included. Thus, the outlet duct segment 26 and the intermediate duct segment 28 may be collectively referred to as telescopic duct segments 26, 28. Furthermore, features shown with common reference numerals in the figures are understand to be generic between all of the segments, whereby description of a particular feature with respect to one of the duct segments 24, 26, 28 applies to the corresponding feature of other ones of the duct segments 24, 26, 28 unless otherwise specified. Referring to FIG. 5 (as enumerated on the inlet duct segment 24), each of the duct segments 24, 26, 28 may be described as including a duct segment wall 23 extending along an axial direction from a first duct end 25*a* to a second duct end 25*b*. Thus, as used herein, features of each duct segment 24, 26, 28 may be defined relative to first ends 23*a* (i.e., inlet ends) and second ends (i.e., outlet ends).

Additionally, in some examples, each of the duct segments 24, 26, 28 of the movable duct 16 are comprised of polyethylene. However, it is also contemplated that the portions of the movable duct may be comprised of another material including but not limited to steel, aluminum, silicone or another plastic polymer. Additionally, in some examples the movable duct 16 is produced through a blow molding process. Moreover, in some examples, the movable duct 16 is formed in a single piece, which is then sectioned in portions for later assembly.

Referring still to the example shown in FIGS. 3-6, an inlet diameter of the inlet duct segment 24 is smaller than an outlet diameter of the outlet duct segment 26 to facilitate airflow between the HVAC system 14 and the user device charging station 20. Additionally, in some examples, the diameter of the movable duct 16 is smallest at the inlet duct segment 24 and largest at the outlet duct segment 26 such that air flow from the HVAC system 14 to the user device charging station 20 is encouraged and limits air leakages.

Figure 3:
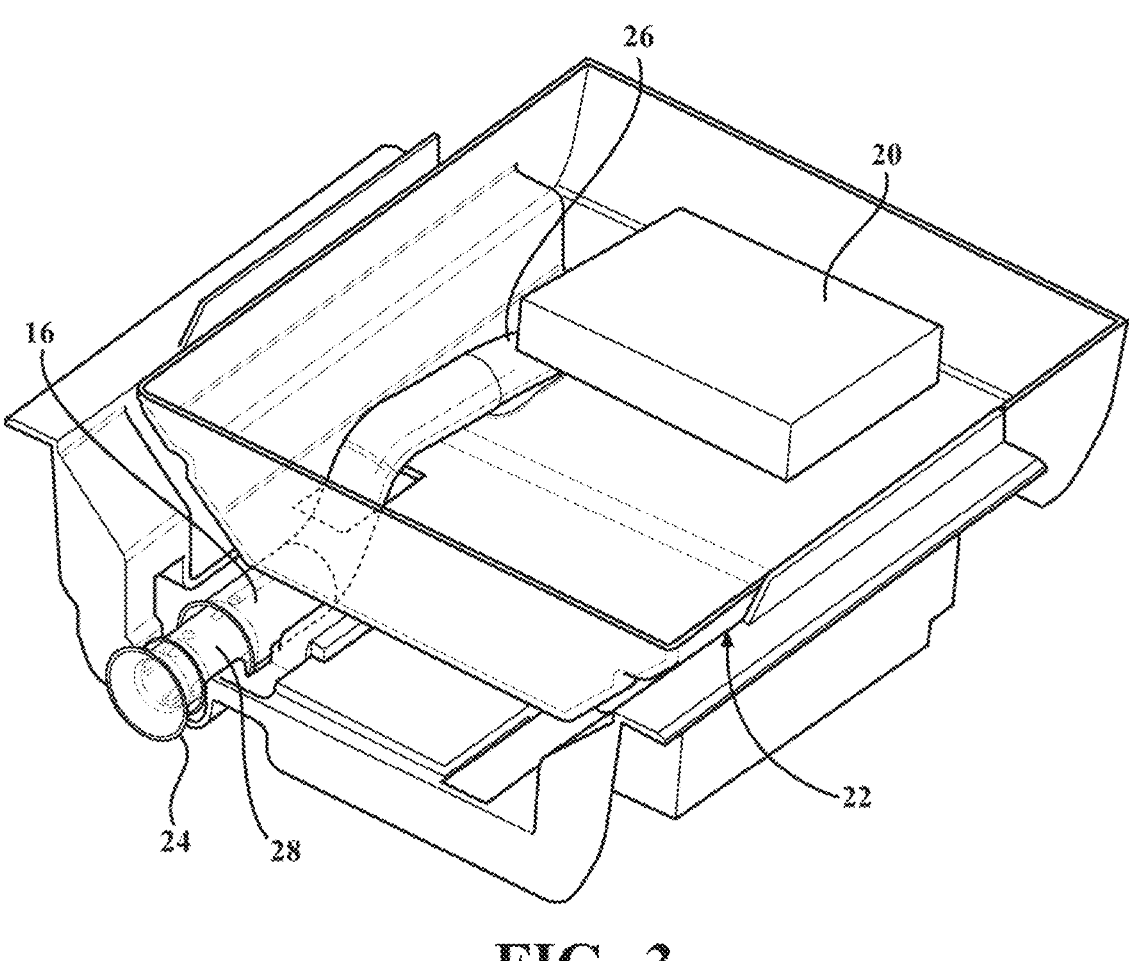
FIG. 3 is front perspective view of the vehicle console of FIG. 2, showing the vehicle console coupled to an example of a movable duct according to the principles of the present disclosure.
Figure 4:
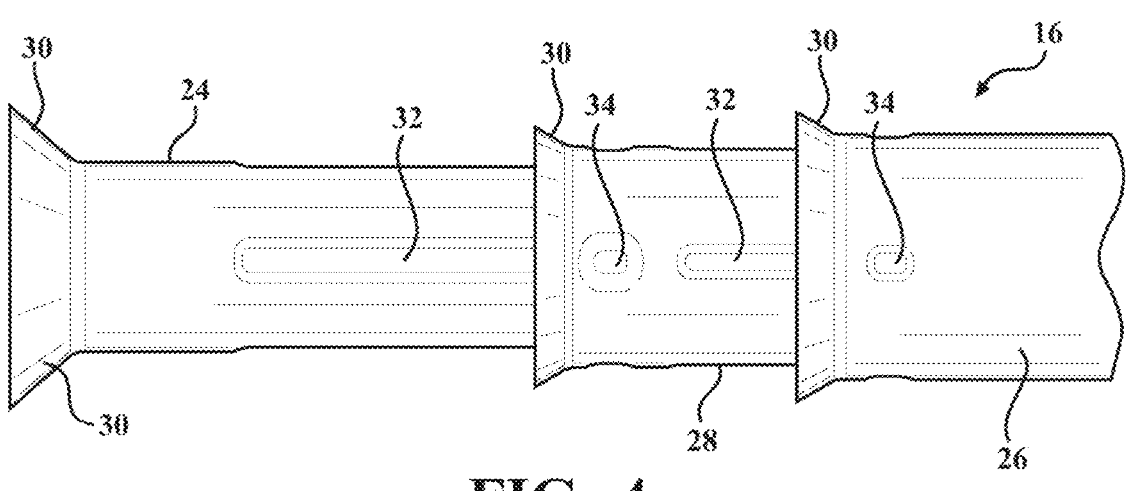
FIG. 4 is a side elevation view of the movable duct according to the principles of the present disclosure.

Referring again to the example shown in FIGS. 3-6, the inlet duct segment 24 includes a bell mouth 30 disposed about its first end configured to be coupled to the HVAC system 14. In the example shown, the bell mouth 30 is a flared portion disposed about the inlet of the inlet duct segment 24 and may be configured to lower the air velocity at the point at which the air enters the movable duct 16 from the HVAC system 14 and allow a gradual increase to the specified system air velocity as the flow of air transitions from the bell mouth 30 to a main body of the inlet duct segment 24. Moreover, the bell mouth 30 may also present packaging, manufacturing, or other advantages such as noise and pressure loss reductions. In some examples, the inlet duct segment 24 is fixed to the vehicle 10, more specifically to the HVAC system 14, such that the inlet duct segment 24 does not move during extension and retraction of the movable duct 16. As best shown in FIGS. 4-6, an opposite end 25*b* from the bell mouth 30 of the inlet duct segment 24 includes various coupling mechanisms configured to allow another portion of the movable duct 16 to be coupled thereto. As described above, the opposite end of the inlet duct segment 24 may be coupled to the outlet duct segment 26 or an intermediate duct segment 28, depending on the number of portions included in the movable duct 16.

To facilitate the coupling of the inlet duct segment 24 to a telescopic segment 26, 28, the inlet duct segment 24 includes one or more guides 32 defined therein. In some examples, the guides 32 are generally linear and extend along the length of the inlet duct segment 24. It is contemplated that the guides 32 may be formed as linear features extending along an axial direction of the inlet duct segment 24. In the illustrated example, the guides 32 are formed as recessed channels formed in the duct body 17 of the inlet duct segment 24. In other words, the guides 32 are recessed radially inwardly from an outer diameter of the portion of the duct body 17 forming the inlet duct segment 24. In the example shown, the inlet duct segment 24 includes a plurality of guides 32 disposed about the inlet duct segment 24, however, various other configurations have been contemplated. The plurality of guides 32 are configured to engage and act as sliding surfaces for a corresponding protrusion 34 disposed on an adjacent segment 26, 28. In the example shown, the protrusion 34 is formed on an inner surface of the adjacent segment 26, 28, such as the intermediate segment 28 or the outlet duct segment 26, and is shaped and sized to slide within the guide 32 to facilitate movement between the two portions. As best shown in FIG. 6, a radius to an inner surface of each protrusion may be greater than the radius of the ramp locating feature 36 at the second duct end 25*b*, but less than the outer radius of the ramp locating feature 36 adjacent to the guide 32, whereby the ramp locating feature 36 defines a bump or detent that provides a snap-fit relationship with the protrusion 34 and functions to retain the protrusion 34 within the guide 32 when the duct 16 is assembled.

The guide 32 includes a hard stop 40 at a distal end of the guide 32 (i.e., the end closest to the bell mouth 30) to prevent the mating segments 26, 28 from retracting too far into the inlet duct segment 24. Additionally, the hard stop 40 may be configured to provide audible feedback (e.g., a click) during assembly when the hard stop 40 comes in contact with the protrusion 34, indicating correct assembly of the duct segments. In some examples, the shape of the protrusion 34 allows the protrusion 34 to maintain only a localized contact with the guide 32 such that minimum friction occurs between components. Additionally, in some examples, the protrusion 34 is generally rectangular, however, various other configurations have also been contemplated. Moreover, in the example shown, an inner surface of the adjacent portion, such as the intermediate duct segment 28 or the outlet duct segment 26, includes a plurality of protrusions 34 disposed about the adjacent portion and configured to engage with each of the plurality of the guides 32. Having the guides 32 and corresponding protrusions 34 disposed circumferentially about each of the inlet duct segment 24 and the adjacent telescopic segment 26, 28, such as the intermediate duct segment 28 or the outlet duct segment 26, prevents undesired rotational motion between the components when coupled to one another.

In some examples, the inlet duct segment 24 may also include a ramp leading portion 36. The ramp leading portion 36 is disposed about the opposite end of from the bell mouth 30 and is configured to mate with the bell mouth 30 of an adjacent telescopic duct segment 26, 28. In some examples, the ramp leading portion 36 extends at an angle towards the interior of the inlet segment 24 to facilitate coupling of the inlet duct segment 24 with the adjacent telescopic duct segment 26, 28. In other words, the ramp leading portion 36 defines a tapered diameter forming a conical end of the inlet duct segment 24 and an opposite end from the bell mouth 30. In some examples, the taper angle ranges from 15 degrees to 75 degrees relative to a central axis defined by the inlet duct segment 24. In the illustrated example, the taper angle is 45 degrees. This configuration allows for ease of assembly of the inlet duct segment 24 and the adjacent segment 26, 28, such as the intermediate duct segment 28 or the outlet duct segment 26. Additionally, the ramp leading portion 36 optimizes packaging space and is configured to absorb any cutting variation during manufacturing while maintaining a constant overall length. In other words, by forming the end of the inlet duct segment 24 with the tapering ramp leading portion 36, the inlet duct segment 24 can be cut to a desired length during a post-mold processing step, whereby the tapered ramp leading portion 36 accommodates some variation in the diameter of the ramp leading portion 36 at the cut line. However, various other configurations have been contemplated.

As best shown in FIGS. 5 and 6, the inlet duct segment 24 may also include a ramp locating feature 38. The ramp locating feature 38 is configured to allow the protrusion 34 to easily align with and enter the guide 32 during assembly of the duct. The ramp locating feature 38 is disposed on the ramp leading portion 36, aligned with the guide 32, and includes a wider end portion than the remainder of the guide 32. In the example shown, the ramp locating feature 38 is a trapezoidal shape corresponding with a rectangular shaped protrusion 34. Thus, an overall width $W_{38}$ of the ramp locating feature 38 is substantially larger than a corresponding width of the protrusion 34 at the end of the end of the ramp leading portion 36, but tapers along the direction from the end to the guide 32 to gradually align the protrusion with the guide 32 as the inlet duct segment 24 is inserted into the other duct segment 26, 28. Additionally, in the example shown, a plurality of ramp locating features 38 are disposed about the inlet duct segment 24 and in line with each of the guides 32.

Referring still to the example shown in FIG. 3, the outlet duct segment 26 is fixedly coupled to the vehicle console 22 and configured to provide airflow to the user device charging station 20. The outlet duct segment 26 may include many of the features as described above with respect to the inlet duct segment 24, including, but not limited to, the protrusion 34 and the bell mouth 30. The outlet duct segment 26 may not include any guides 32 and may have a smooth exterior as no other additional duct segments are coupled to the outlet duct segment 26. Additionally, in some examples, the protrusion 34 of the outlet duct segment 26 is configured to engage the guide 32 of the adjacent duct segment 24, 28.

In the example shown, the intermediate duct segment 28 is coupled between the inlet duct segment 24 and the outlet duct segment 26 and includes many features as described above with respect to the inlet duct segment 24, including, but not limited to the bell mouth 30, the plurality of protrusions 34 configured to engage the guides 32 of the inlet duct segment 24, guides 32 configured to be engaged by the protrusion 34 of the outlet duct segment 26, the ramp loading portion 36, and the ramp locating features 38. While the illustrated example shows a single intermediate duct segment 28, other examples may include any number of intermediate duct segments 28 to provide a desired extension length, where each intermediate duct segment 28 includes the bell mouth 30, the plurality of protrusions 34 the plurality of guides 32, the ramp loading portion 36, and the ramp locating features 38. However, various other configurations have also been contemplated.

Referring still to the example shown in FIGS. 3-6, in operation, the movable duct 16 may be produced as a single piece prior to being cut into various components including the inlet duct segment 24, the outlet duct segment 26, and the intermediate duct segment 28 by a guillotine or other cutting device. The movable duct 16 is then assembled by securing the inlet duct segment 24 and aligning the protrusions 34 on the intermediate duct segment 28 with the ramp locating features 38 of the inlet duct segment 24. The intermediate duct segment 28 is then slid onto the inlet duct segment 24 until the protrusion 34 reaches the hard stop 40 of the guide 32, which will produce a snapping or clicking sound indicating that the duct segments 24, 28 are assembled correctly. Next, the protrusions 34 of the outlet duct segment 26 are aligned with the ramp locating features 38 of the intermediate duct segment 28. The outlet duct segment 26 is then slid onto the intermediate duct segment 28 until the protrusion 34 reaches the hard stop 40 of the guide 32, which will produce a snapping or clicking sound indicating that the portions are assembled correctly. The movable duct 16 can then be inserted into the vehicle 10 having the inlet duct segment 24 coupled to the vehicle HVAC system 14 and the outlet duct segment 26 coupled to the user device charging station 20 in the vehicle console 22. When the vehicle console 22 is in the first position, the movable duct 16 remains in the retracted configuration. However, when the vehicle console 22 is moved to the second position, the outlet duct segment 26 of the movable duct 16 slides along the guide 32 of the intermediate duct segment 28 and away from the inlet duct segment 24 to the extended configuration, extending the length of the movable duct 16 and ensuring air flow to the user device charging station 20. When the vehicle console 22 is moved back to the first position, the second end of the movable duct 16 slides back along the guide 32 of the intermediate duct segment 28 towards the inlet duct segment 24 to the retracted configuration, reducing the length of the movable duct 16 and ensuring air flow to the user device charging station 20.

The vehicle 10 having the movable duct 16 as described herein can accommodate the variation of the position change of the movable console 22 and provide a constant direct airflow to the user device charging station 20 regardless of the position change. The movable duct 16 allows the airflow to be directed towards a specific target, reducing air losses towards the target. This concept minimizes the loss of air to the user device charging station 20 and prevents the airflow from always being at maximum power to ensure that air reaches the charger, which reduces the annoying noises that the customer may hear during maximum power producing a more pleasant driving experience.

The foregoing description has been provided for purposes of illustration and description. It is not intended to be exhaustive or to limit the disclosure. Individual elements or features of a particular configuration are generally not limited to that particular configuration, but, where applicable, are interchangeable and can be used in a selected configuration, even if not specifically shown or described. The same may also be varied in many ways. Such variations are not to be regarded as a departure from the disclosure, and all such modifications are intended to be included within the scope of the disclosure.

What is claimed is:

1. A movable duct for a motor vehicle, the movable duct comprising:
- an inlet duct segment including:
  - an inlet duct wall extending from a first inlet duct end to an opposite second inlet duct end;
  - an elongate guide extending between the first inlet duct end and the second inlet duct end, wherein the elongate guide defines an inward recessed channel formed in the inlet duct wall and extending along an axial direction of the inlet duct segment; and
  - a ramp leading portion formed at the second inlet duct end, the ramp leading portion extending at an angle towards an interior of the second inlet duct end and including an inward locating feature; and
- a first telescopic duct segment including:
  - a first telescopic duct wall extending from a first telescopic duct end to an opposite second telescopic duct end; and
  - a protrusion configured to slidingly engage with the elongate guide of the inlet duct segment, wherein the protrusion is formed on and extends inward from an inner surface of the first telescopic duct segment and is configured to slide within the inward recessed channel of the elongate guide,
- wherein the ramp leading portion is configured to receive and align the protrusion of the first telescopic duct segment with the elongate guide of the inlet duct segment.

2. The movable duct of claim 1, wherein the second inlet duct end of the inlet duct segment includes a leading portion defining a tapering width of the inlet duct wall.

3. The movable duct of claim 2, wherein the first telescopic duct end includes a bell mouth defining a flared width of the first telescopic duct segment, whereby the leading portion is configured to mate with the bell mouth.

4. The movable duct of claim 2, wherein the inward locating feature is configured to receive and align the protrusion of the first telescopic duct segment with the elongate guide of the inlet duct segment.

5. The movable duct of claim 1, wherein;

the first telescopic duct segment also includes a second elongate guide extending between the first telescopic duct end and the second telescopic duct end; and the movable duct further comprises a second telescopic duct segment including:

a second telescopic duct wall extending from a third telescopic duct end to an opposite fourth telescopic duct end; and a second protrusion configured to slidingly engage the second elongate guide of the first telescopic duct segment.

6. A vehicle comprising:

a vehicle heating, ventilation, and air conditioning (HVAC) system configured to bring air to a desired temperature;

a vehicle passenger compartment configured to allow a vehicle passenger therein; and a movable duct having a body defining an interior conduit configured to provide fluid communication from the vehicle HVAC system to the vehicle passenger compartment, the body having:

an inlet duct segment coupled to the vehicle HVAC system and including:

an inlet duct wall extending from a first inlet duct end to an opposite second inlet duct end;

an elongate guide extending between the first inlet duct end and the second inlet duct end, wherein the elongate guide defines an inward recessed channel formed in the inlet duct wall and extending along an axial direction of the inlet duct segment; and a ramp leading portion formed at the second inlet duct end, the ramp leading portion extending at an angle towards an interior of the second inlet duct end and including an inward locating feature; and an outlet duct segment coupled to the vehicle passenger compartment, wherein the outlet duct segment is movable between an extended configuration where the outlet duct segment is located in a first location in the vehicle passenger compartment and a retracted configuration where the outlet duct segment is located in a second location in the vehicle passenger compartment, and wherein the outlet duct segment includes:

a first telescopic duct wall extending from a first telescopic duct end to an opposite second telescopic duct end; and a protrusion configured to slidingly engage with the elongate guide of the inlet duct segment, wherein the protrusion is formed on and extends inward from an inner surface of the outlet duct segment and is configured to slide within the inward recessed channel of the elongate guide, wherein the ramp leading portion is configured to receive and align the protrusion of the outlet duct segment with the elongate guide of the inlet duct segment.

7. The vehicle of claim 6, wherein movement of the movable duct between the extended configuration and the retracted configuration is translational movement.

8. The vehicle of claim 7, wherein the movement of the movable duct between the extended configuration and the retracted configuration is telescopic movement such that the inlet duct segment and the outlet duct segment are concentric.

9. The vehicle of claim 6, wherein the body of the movable duct further includes one or more intermediate duct segments concentric with the inlet duct segment and the outlet duct segment.

10. The vehicle of claim 6, wherein the outlet duct segment includes a retaining protrusion configured to slidingly engage the elongate guide to prevent rotational movement between the inlet duct segment and the outlet duct segment.

11. The vehicle of claim 10, wherein the ramp leading portion is configured to aid coupling of the inlet duct segment and the outlet duct segment.

12. The vehicle of claim 6, wherein the vehicle passenger compartment includes a movable vehicle console, and the outlet duct segment is at least partially disposed within the movable vehicle console.

13. The vehicle of claim 6, wherein at least one of the inlet duct segment or the outlet duct segment is produced by a blow molding operation.

14. A movable duct for a vehicle having a vehicle heating, ventilation, and air conditioning (HVAC) system and a vehicle passenger compartment, the movable duct comprising:

a body defining an interior conduit and having:

an inlet duct segment coupled to the vehicle HVAC system and including:

an inlet duct wall extending from a first inlet duct end to an opposite second inlet duct end;

an elongate guide extending between the first inlet duct end and the second inlet duct end, wherein the elongate guide defines an inward recessed channel formed in the inlet duct wall and extending along an axial direction of the inlet duct segment; and a ramp leading portion formed at the second inlet duct end, the ramp leading portion extending at an angle towards an interior of the second inlet duct end and including an inward locating feature; and an outlet duct segment coupled to the vehicle passenger compartment, wherein the outlet duct segment is linearly movable between an extended configuration and a retracted configuration and movement of the outlet duct segment between the extended configuration and the retracted configuration is telescopic movement such that the inlet duct segment and the outlet duct segment are concentric, and wherein the outlet duct segment includes:

a first telescopic duct wall extending from a first telescopic duct end to an opposite second telescopic duct end; and a protrusion configured to slidingly engage with the elongate guide of the inlet duct segment, wherein the protrusion is formed on and extends inward from an inner surface of the outlet duct segment and is configured to slide within the inward recessed channel of the elongate guide, wherein the ramp leading portion is configured to receive and align the protrusion of the outlet duct segment with the elongate guide of the inlet duct segment.

15. The movable duct of claim 14, wherein the body of the movable duct further includes an intermediate duct segment concentric with the inlet duct segment and the outlet duct segment.

16. The movable duct of claim 15, wherein the body of the movable duct further includes a second intermediate duct segment concentric with the inlet duct segment, the intermediate duct segment, and the outlet duct segment.

17. The movable duct of claim 14, wherein one or more of the inlet duct segment or the outlet duct segment includes a retaining protrusion configured to prevent rotational movement between the inlet duct segment and the outlet duct segment.

18. The movable duct of claim 14, wherein a diameter of a circular cross section of the inlet duct segment is smaller than a diameter of a circular cross section of the outlet duct segment.

* * * * *